United States Patent [19]
Augello et al.

[11] Patent Number: 4,663,718
[45] Date of Patent: May 5, 1987

[54] DISPLAY UNIT FOR TRIP COMPUTER

[75] Inventors: Daniel Augello, La Celle Saint Cloud; Pierre H. Robert, Bougival, both of France; Toru Teshima, Yokohama; Hidehiko Naete, Kawasaki, both of Japan

[73] Assignees: Regie Nationale des Usines Renault, Boulogne Billancourt, France; Stanley Electric Co., Ltd., Tokyo, Japan

[21] Appl. No.: 862,198

[22] Filed: May 9, 1986

Related U.S. Application Data

[63] Continuation of Ser. No. 570,081, Jan. 12, 1984, abandoned.

[30] Foreign Application Priority Data

Jan. 12, 1983 [JP] Japan ..................................... 58-2363

[51] Int. Cl.[4] .......................... G06F 3/14; G06F 15/50
[52] U.S. Cl. .................................... 364/444; 364/442; 364/561; 73/114; 340/52 F
[58] Field of Search ............... 364/424, 433, 442, 444, 364/561, 565; 324/160, 166, 178; 377/20, 24; 340/52 F, 901; 73/113, 114

[56] References Cited

U.S. PATENT DOCUMENTS

| | | | |
|---|---|---|---|
| 4,179,740 | 12/1979 | Malin | 364/424 |
| 4,216,530 | 8/1980 | Yamaki et al. | 364/565 |
| 4,217,644 | 8/1980 | Kato et al. | 364/442 |
| 4,344,136 | 8/1982 | Panik | 364/424 |
| 4,357,663 | 11/1982 | Robbins et al. | 364/433 |
| 4,371,934 | 2/1983 | Wahl et al. | 364/424 |
| 4,371,935 | 2/1983 | Yamaki | 364/424 |
| 4,371,940 | 2/1983 | Yamaki et al. | 364/424 |
| 4,400,779 | 8/1983 | Kosuge et al. | 364/442 |
| 4,442,424 | 4/1984 | Shirasaki et al. | 340/52 F |

*Primary Examiner*—Gary Chin
*Attorney, Agent, or Firm*—Oblon, Fisher, Spivak, McClelland & Maier

[57] ABSTRACT

A number of displays are made by the combination of numerals and pictographs on an indicator which provides numerical values of information obtained from desired signals selected from display signals wherein units and meanings of the numerical values are obtained by operating a single selection switch which drives a selector and a single reset switch which resets a driving distance computing circuit and a running time computing circuit. The selection switch and the reset switch are installed integrally on the face plate of the single indicator used.

2 Claims, 12 Drawing Figures

DISPLAY UNIT FOR TRIP COMPUTER

This application is a continuation, of application Ser. No. 570,081, filed Jan. 12, 1984 now abandoned.

BACKGROUND OF THE INVENTION

1. Field of the Invention

This invention relates to a display unit for trip computer, on which various information on running such as running distance, running hour, average car speed, remaining fuel quantity, possible running distance, instantaneous fuel consumption, average fuel consumption, open-air temperature, etc. are displayed upon computation and conveyed to a car driver.

DISCUSSION OF THE BACKGROUND

Recently, fuel-consumption-saving has been required for cars, while the trend of higher-speed driving has been causing an increase in driving distance per day. This results in an increase in popularity of systems which display various kinds of information necessary for running and which functions as a navigator.

Conventionally, information display units for the system of the above kind are lacking in uniformity of kinds of display and are insufficient to the necessary kinds of display and the means for conveying what are displayed because of the requirement for multiple display on a limited area of panel, making it difficult to instantaneously judge what is or are displayed. Accordingly, the conventional units have disadvantages or shortcomings such as being unable to easily display a 50 KM/H average car speed, the max. car speed, or the present car speed, and not being simple to obtain necessary displays because of many switches for selecting necessary information despite many kinds of information required to be displayed.

SUMMARY OF THE INVENTION

With the above disadvantages and shortcomings in mind, the present invention has an object of providing a display unit for a trip computer capable of performing segment displays of remaining fuel quantity, instantaneous fuel consumption, average car speed, possible driving distance by the use of remaining fuel, average fuel consumption, driving time, driving distance and open-air temperature on one and the same indicator by combining and computing relevant unit times and data signals from a fuel level sensor, fuel flow sensor, speed sensor and open-air temperature.

Accordingly the present invention provides for a small number of pictographs on one indicator display by which a driver may readily recognize what in meant by numerical values shown by the segment displays. A selector is driven by operating only each one selection switch and reset push-button installed together on a panel to make it possible to selectively display many kinds of information on a limited area of the panel.

BRIEF DESCRIPTION OF THE DRAWINGS

Description is now made hereinafter of one embodiment of this invention with reference to the accompanied drawings in which:

FIG. 3(*b*) is a side sectional diagram showing a concrete example for measuring fuel quantity in fuel tank;

DETAIL DESCRIPTION OF THE PREFERRED EMBODIMENT

Figure 1:
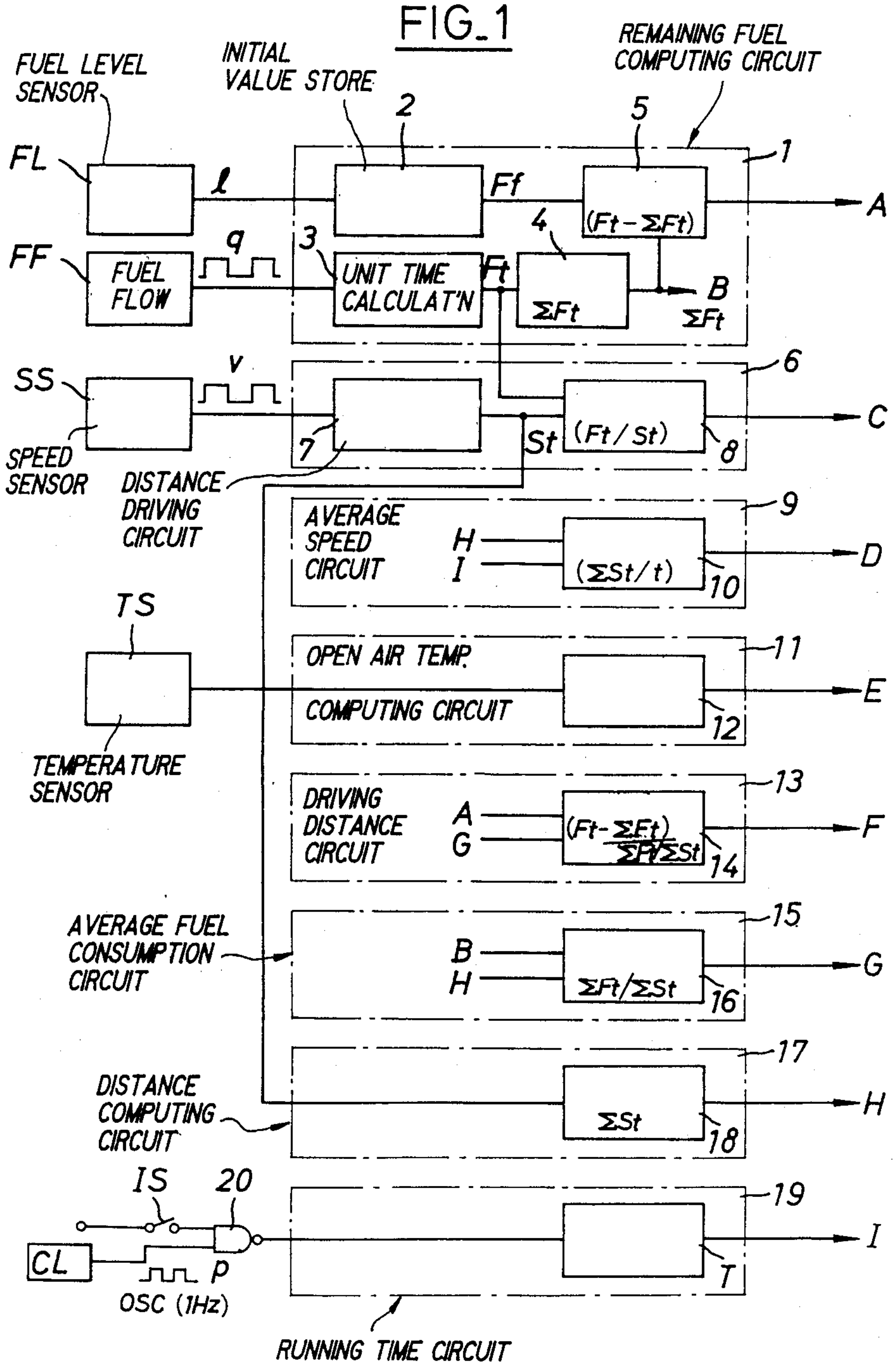
FIG. 1 is a block circuit diagram showing the circuit configuration of the computing circuit group of the display unit of this invention.

Referring to Fig.1, symbol FL is a fuel level sensor for detecting the signal $\rho$ of a varying quantity of fuel remaining in a fuel tank FT (FIG. 3), symbol FF is a fuel flow sensor detecting a flow quantity of fuel flowing per unit time out of a fuel tank FT and producting, as the output, a flow quantity signal q (e.g. one-pulse signal for each flow of fuel/cc), and symbol SS is a speed sensor detecting a revolving speed of wheels (not illustrated) and producing, as the output, velocity signals v, e.g. onepulse signal for each running of 1 meter. Symbol TS is an openair temperature sensor producing, as the output, an open-air temperature signal in proportion to the open-air temperature when detected.

The remaining fuel computing circuit 1 consists of a fuel initial value store circuit 2 storing a remaining fuel initial value Ff, i.e. remaining fuel quantity signals $\rho$ produced at the time of switching on an ignition switch IS, a unit time consumption calculating circuit 3 calculating a unit time fuel consumption Ft (e.g. a consumption for a second) by the use of flow quantity signals q as the data, an adder 4 producing the output of fuel consumption addition value signals B by the calculation of an addition value ΣFT of unit fuel consumption Ft until the time of calculation, and a subtractor 5 subtracting the addition value of ΣFT from the remaining fuel initial value of Ft; i.e. performing the calculation of Ff -ΣFT; and ultimately produces the output of remaining oil quantity display signals A.

The instantaneous fuel consumption computing circuit 6 produces the output of instantaneous fuel consumption display signals C resulting from the computation made by using velocity signals v and unit time fuel consumption Ft as the data ; namely, the circuit consists of a unit time driving distance computing circuit 7 computing a unit time running distance St, i.e. a driving distance for the unit time (1 second) represented by the velocity signal v (e.g. producing 1 pulse every 1-meter of driving), and a divider 8 performing the calculation of Ft/St.

The average car speed computing circuit 9 produces the output of average car speed display signals D resulting from the function of a divider 10 performing the computation of ΣSt/t (where t represents driving hours from the starting to the time of computation) by the use of the input of running distance display signals H which are the output of an adder 18 (described hereinafter) performing the addition of a unit time running distance St and running-hour signals I obtained from counter T (described hereinafter).

The open-air computing circuit 11 produces the output of open-air display signals E resulting from the function of open-air temperature computing element 12 performing the computation of digital signals obtained from the open-air temperature sensor TS.

The possible running distance computing circuit 13 produces the output of the display signals of possible driving distance by the use of remaining fuel F resulting from the function of a divider 14 dividing the numerical value of remaining fuel quantity (Ff -ΣFT) obtained from the remaining fuel computing circuit 1 by the average numerical value of fuel consumption (ΣFT/ΣSt) obtained from an average fuel consumption computing circuit 15 described hereinafter.

The average fuel consumption circuit 15 produces the output of average fuel consumption signals G resulting from the function of a divider 16 computing an average value of fuel consumption, ΣFT/ΣSt, by dividing and added value of fuel consumption, ΣFT, obtained from the adder 4 by an added value of running distance, ΣFt, obtained from a running distance computing circuit 17 described hereinafter.

The driving distance computing circuit 17 produces the output of running distance display signals H resulting from the function of an adder 18 computing an added value of driving distance, ΣSt, at all times in accordance with the unit time driving distance value of St obtained from the unit time running distance computing circuit 7.

The running-hour computing circuit 19 produces the output of running-hour display signals I resulting from the function of a counter T counting the output of NAND gate 20 which is produced from the input of 1-Hz rectangular pulse signals P coming when an ignition switch IS is switched on.

Figure 2:
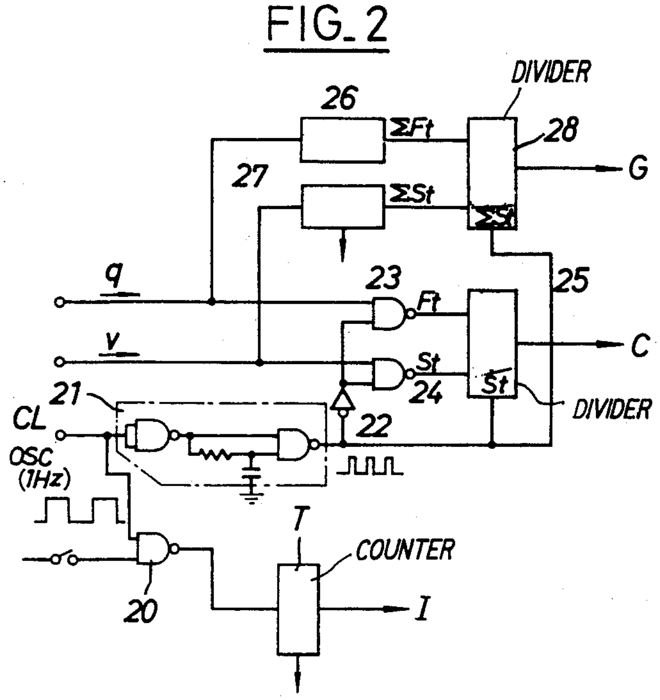
FIG. 2 is a circuit diagram showing a concrete example of one computing circuit in FIG. 1.

FIG. 2 shows a concrete example of a circuit configuration producing the output of average fuel consumption display signals G, instantaneous fuel consumption display signals C and runninghour display signals I in FIG. 1.

The 1-Hz rectangular pulse signals P from a clock pulse oscillator CL are sent under the condition of switching-on of the ignition switch IS through the NAND gate 20 to the counter T as its input, which counts running hours t and produces the output of running-hour display signals I.

On the other hand, part of the rectangular pulse signals p is concerted by a circuit 21 into narrow-width pulses, which are sent through an inverter 22 into each one input end of NAND circuits 23 and 24; the low quantity signals q coming from the fuel flow sensor FF are sent into the other input end of the NAND circuit 23 to produce the signals of unit time fuel consumption Ft as the input on the divided input side of a divider 25; and the velocity signals v coming from the speed sensor SS are sent into the other input end of the NAND circuit 24 to produce the signals of unit time running distance St as the input on the divisor side of the divider 25. Accordingly, the divider 25 produces the output of instantaneous fuel consumption display signals C.

However, parts of the flow quantity signals q and the velocity signals v are counted respectively by counters 26 and 27 to determine ΣFT and ΣSt, which are sent respectively as inputs into a divider 28 dividing ΣFT by ΣSt to produce the output of average fuel consumption signals G.

In the circuit configuration described above, the counter T is equipped with a reset circuit and the dividers 25 and 28 are equipped respectively with each synchronous signal circuit.

The description is omitted concerning the concrete example of a circuit configuration producing the outputs of other display signals of A, D, E, F and H, which is similar to that referred to above.

Figure 3A:
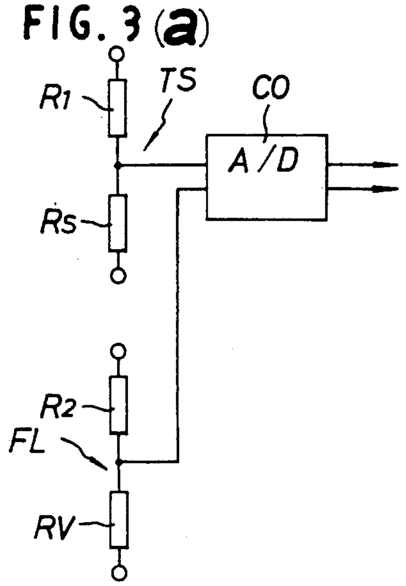
FIG. 3(*a*) is a circuit configuration diagram showing an example each of temperature sensor and fuel level sensor in FIG. 1.
Figure 3B:
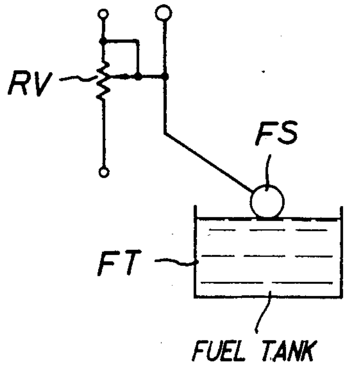
Figure 4:
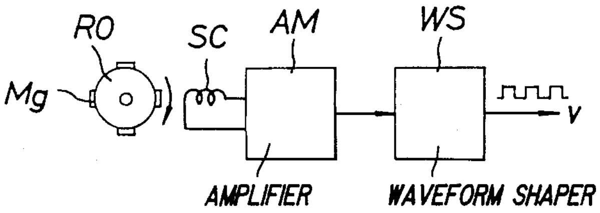
FIG. 4 is a block diagram showing a concrete example of a speed sensor.
Figure 5:
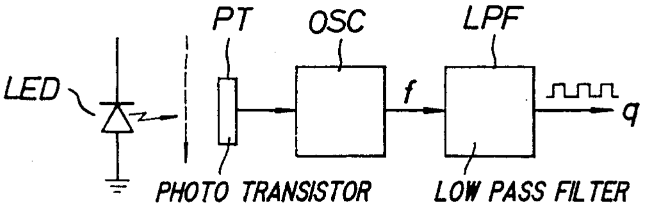
FIG. 5 is a block diagram showing a concrete example of a fuel flow sensor.

Referring to FIG. 3 to FIG. 5, description is made on the concrete examples of each sensor shown in FIG. 1.

FIG. 3 (*a*) shows an example of a circuit for the open-air temperature sensor TS and the fuel level sensor FL; in the circuit the analog signals, which come from the open-air temperature sensor TS consisting of a temperature depending resistors Rs, such as a thermistor, and a base resistor $R_1$, are sent as the input signals into an A/D converter CO converting them into digital signals, which are applied to the open-air temperature display circuit 12. The fuel level sensor FL, for example as shown in FIG. 3 (*b*), controls a potentiometer RV, depending on an upward movement or downward movement of a float FS in accordance with fuel levels in the dual tank FT, and obtains analog signals for fuel levels from resistance ratios of a resistor $R_2$ to the potentiometer RV, whereby the analog signals are sent as input signals into the A/D converter CO converting them into digital signals, which are applied to the remaining fuel computing circuit 1.

FIG. 4 shows a concrete example of the speed sensor SS. Variations in magnetic flux of magnets Mg fixed on the circumference of a rotor, which is connected, for example with a speedometer cable driver gear (not shown), are detected by a sensor coil SC and are amplified by an amplifier AM, while pulse outputs v are obtained in proportion to speeds of a car from a waveform shaper WS. Thus, the speed sensor applies speed data as inputs to the instantaneous fuel consumption computing circuit 6.

Figure 6:
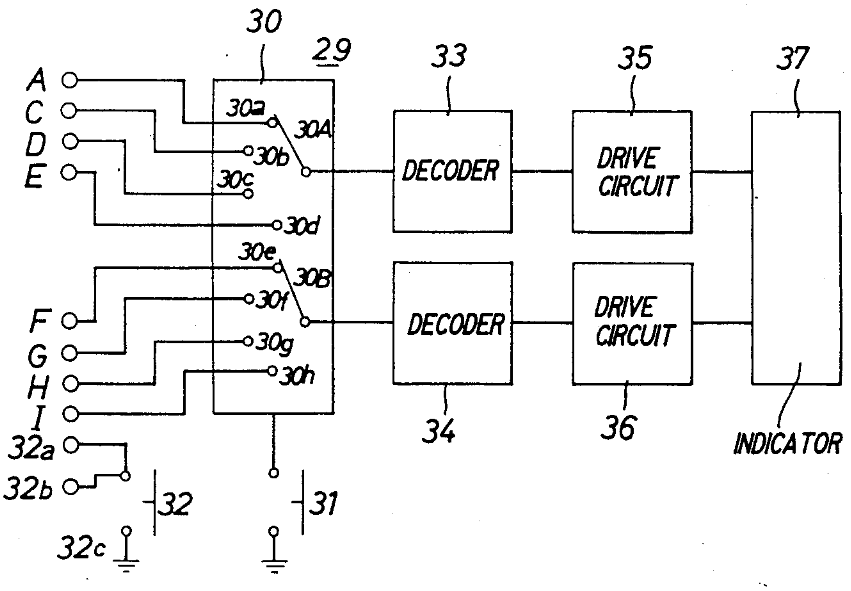
FIG. 6 is a block diagram showing selection circuitry.

FIG. 5 shows a concrete example of the fuel flow sensor. The output face of a light emitting element such as a light emission diode LED is opposed to the light receiving face of a light receving element such as a phototransistor PT, between which an optical flow sensor capable of shielding the light in proportion to flows of fuel for a unit time, whereby oscillation frequency varies depending on flow quantities of fuel; that is to say, oscillation frequency f is high when a flow quantity is large with the input of oscillation circuit OSC as a result of application of output from the light receiving element PT and oscillation frequency f is low when a flow quantity is small with the input of oscillation circuit OSC as a result of application of output from the light receiving element PT ; and, after removing high-frequency noises from these types of oscillating output by passing them through a low-pass filter LPF, the flow quantity signals q, for example in the pulse waveform of 1 CC/pulse, are applied to the remaining fuel computing circuit 1. FIG. 6 shows a select circuit 29 for displaying desired kinds of information on one and the same display element panel by selecting each corresponding output from any of computing circuits 1, 6, 9, 11, 13, 15, 17 and 19 shown in FIG. 1. A selector 30 consists of two sets of circuit configuration, one being one switching circuit comprising a movable contactor 30A and corresponding fixed contacts 30*a*, 30*b*, 30*c* and 30*d*, and the other being another switching circuit comprising a movable contactor 30B and corresponding fixed contacts 30*e*, 30*f*, 30*g* and 30*h*. The movable contactor 30A and the movable contactor 30B move together so as to perform switching function.

Each of the fixed contacts 30*a* to 30*h* are connected so as to obtain in sequence each input of display signals A, C, D, E, F, G, H and I. The selector 30 has also one more circuit configuration, which enables the movable contactors 30A and 30B to perform switching motions in sequence by operating a selection switch 31. The circuit configuration described above is not shown, because the switching motions of the movable contactors 30A and 30B can be made by use of a known mechanical construction or electronic circuit.

Terminals 32*a* and 32*b* of a reset switch 32 are connected with each reset terminal (not shown) of the running-hour computing circuit 17 and the running time computing circuit 19, while a terminal 32*c* is grounded. Accordingly, the computing circuits 17, 19 are reset when a reset button (not shown) is pressed.

The movable contactor 30A is connected with a decoder 33, which is connected with a drive circuit 35. Similarly, the movable contactor 30B is connected with a decoder 34, which is connected with a drive circuit 36. Each output of the decoders 33, 34 are applied to an indicator 37 to produce its inputs.

Each of the decoders 33, 34 has a 7-segment decoder (not shown) and a pictographic display decoder (not shown).

By the inputs obtained from the decoders 33, 34, the drive circuits 35, 36 produce output signals, which drive display elements such as liquid crystal forming 7-segment display elements and pictographs (described hereinafter) on an indicator 37.

FIG. 7 to FIG. 11 shows display patterns on the indicator 37.

Figure 7:
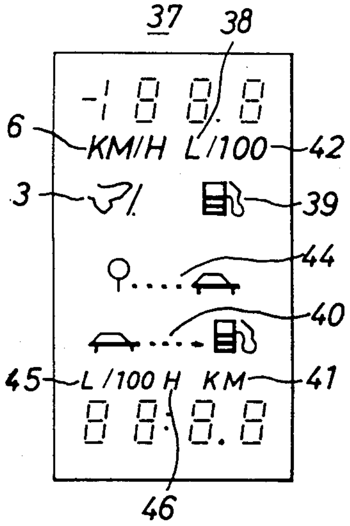
FIG. 7 to FIG. 11 show each example of displays.

FIG. 7 shows the face panel of indicator 37, on which all numerical displays and pictographs are displayed at the time of the whole lighting, which makes it possible to display each 7-segment numerical display at the top and on the bottom and to display pictographs 39 to 46 indicating the units and meanings of the above numerical displays between the top numerical display and the bottom numerical display.

FIG. 8 to FIG. 11 shows each state of displays for desired kinds of information described hereinafter.

As a matter of course, segment display elements with any number of segments may be used instead of the 7-segment display elements.

Meanwhile, description is made on the functions of the display unit according to this invention. In running a car, the reset switch 32 is pressed to reset the running distance computing circuit 17 and the running-hour computing circuit 19. Then, the ignition switch IS is set to "ON", whereby the outputs of NAND gate 20, resulting from the inputs of 1-Hz pulse signals coming from the clock oscillator CL, are counted by the counter T, the outputs of which are used as the running-hour display signals I in the average car speed computing circuit 9 and are used to display running hours.

Figure 8:
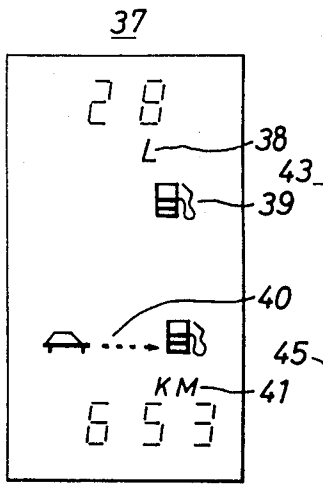

When a driver wants to know a quantity of remaining fuel and a possible driving distance by the use of the remaining fuel, he is requested to press down the selection switch 31 by a desired number of times or for a desired duration of time, whereby the movable contactor 30A of the selector 30 comes in contact with the fixed contact 30*a* to which the remaining fuel display signals A are applied as its input, while similarly, the movable contactor 30B comes in contact with the fixed contact 30*e* to which the possible running distance display signals F are applied as its input. Accordingly, numerical values of remaining fuel quantity and corresponding pictographs are displayed on the indicator 37 with the relative display signals being applied thereto from the movable contactor 30A through the decoder 33 and the drive circuit 35, and at the same time numerical values of possible running distance and corresponding pictographs are displayed on the indicator 37 with the relative display signals being applied threto from the movable contactor 30B through the decoder 34 and the drive circuit 36. Concerning the patterns in this case, as shown in FIG. 8, for example, numeral 28 of 7-segment display, pictograph of L(38) showing liters and pictograph (39) of tank showing fuel are displayed on the upper part of the indicator 37, and at the same time the numeral of 653 showing possible running distance, pictograph (40) meaning that the pictograph shows possible running distance, and pictograph (41) showing the unit of Km are displayed on the lower part of the indicator 37.

Figure 9:
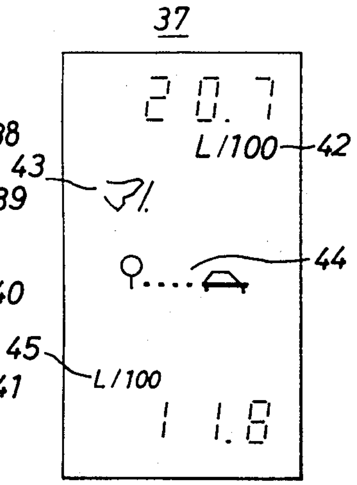

When the driver wants to know an instantaneous fuel consumption and an average fuel consumption, he is requested to operate the selection switch 31 so that the movable contactor 30A may come in contact with the fixed contact 30*b* and the movable contactor 30B may come in a contact with the fixed contact 30*f*. As a result of doing so, as shown in FIG. 9, numerical value of instantaneous fuel consumption, 20.7 in the Fig., pictograph (42) showing the unit, and pictograph (43) showing that the car is running and leading to the judgement of instantaneous fuel consumption are displayed on the upper part of the indicator 37, and at the same time pictograph (44) showing the running distance, numerical value, 11.8 in the Fig., and pictograph (45) showing the unit and leading to the judgement of average fuel consumption are displayed on the lower part of the indicator 37.

Figure 10:
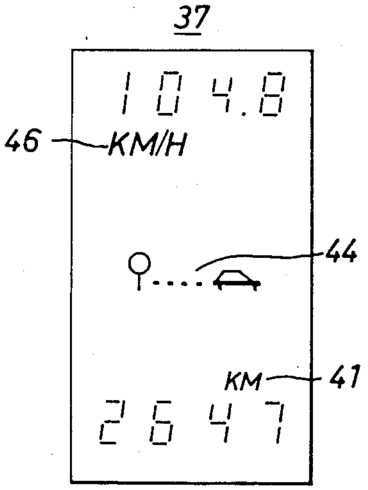

An further, by operating the selection switch 31, as shown in FIG. 10, average car speed of 104.8 Km/H and running distance of 264.7 Km are displayed by means of pictographs (41), (44) and (46) on the indicator 37.

Figure 11:
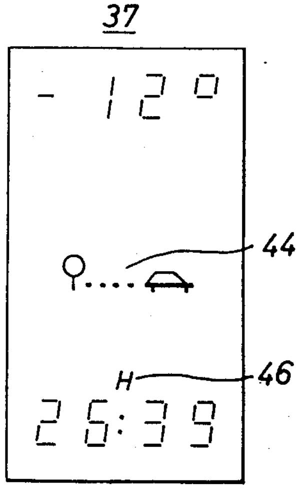

And also, as shown in Fig.11, open-air temperature, for example −12°, and driving hours, for example 26.39 H, by means of pictographs (44), (46), are displayed on the indicator 37.

As described above, this invention makes it possible to display the remaining fuel quantity, instantaneous fuel consumption, average car speed, possible running distance by the use of remaining fuel, average fuel consumption, running hours, etc., all of them being obtainable by combining and computing data and hour data coming from the fuel level sensor, fuel flow sensor, speed sensor, open-air temperature sensor, etc., by means of using commonly same segments. At the same time, the display unit according to this invention is constructed so that the units and meanings of these segment-display numerals can be displayed by the combination and common use of a small number of pictographs and so that each kind of desired information can be displayed selectively only by operating one selection switch and one reset switch, both of which are installed integrally on the display unit of this invention. Briefly speaking, the display unit of this invention makes it possible for a driver to recognize simply and easily recognized the desired information, while driving, in addition to making it feasible to effectively utilize a limited area of panel face.

What is claimed is:

1. A diplay unit for a trip computer including a remaining fuel computing circuit producing, at its output, display signals of remaining fuel quantity; an instantaneous consumption computing circuit producing, at its output, display signals of instantaneous fuel consumption during the driving of an automobile; a driving time computer circuit producing, at its output, display signals of running time from a desired time after starting the engine of said automobile; a driving distance computing circuit producing, at its output, display signals of driving distance; and average fuel consumption computing circuit producing, at its output, display distance utilizing said remaining fuel quantity; at its output, display signals of average car speed during driving; and an open-air temperatured computing circuit producing, at its output, display signals of open-air temperature, wherein there is at least one signal obtainable from a fuel quantity in a fuel tank, a fuel flow from said fuel tank, the car speed, an open-air temperature, and clock pulses which are used as data for producing all of said display signals as well as sequential selection means which selects, in sequence, each of said display signals which are converted and output to driving circuits of an indicator through the use of segment decoders and pictographic display decoders, said display unit further comprising:

means for displaying at least one of said selected signals including a means for displaying a selected combination of numerals and pictographs each of said selected combination being associated with a respective one of said selected signals;

a selector switch for actuating and controlling said selection means for providing said sequential selection of said display signals, said selector switch being operator controlled; and an operator control reset switch for resetting said driving distance computing circuit and said driving time computing circuit;

whereby a first operation of said selector switch by said operator activates said selection means which activates a first one of said display signals and wherein a second operation of said selector switch selects a second one of said display signals and wherein each sequential subsequent activation of said selector switch activates said selection means to, in turn, select subsequent sequential ones of said display signals and wherein each of said display signals is provided to said means for displaying a selected combination of numerals and pictographs in order to provide said operator with a display which indicates by said numerals, the values of said display and by said pictographs, a visual indication of the type of unit measurement being displayed and whereby each of said display signals are displayed, in a sequence controlled by the operation of said selector switch, on the same area of said indicator.

2. The display unit for trip computer according to claim 1, wherein said selector switch (31) and said reset switch (32) are installed integrally on the face of the indicator (37).

* * * * *